United States Patent
Soczka-Guth et al.

(10) Patent No.: US 6,632,847 B1
(45) Date of Patent: Oct. 14, 2003

(54) POLYMER COMPOSITION, MEMBRANE CONTAINING SAID COMPOSITION, METHOD FOR THE PRODUCTION AND USES THEREOF

(75) Inventors: Thomas Soczka-Guth, Schelklingen (DE); Georg Frank, Tübingen (DE); Jochen Baurmeister, Eckernförde (DE); Jürgen Pawlik, Frankfurt (DE); Rüdiger Knauf, Aull (DE)

(73) Assignee: Celanese Ventures GmbH, Frankfurt (DE)

( * ) Notice: Subject to any disclaimer, the term of this patent is extended or adjusted under 35 U.S.C. 154(b) by 0 days.

(21) Appl. No.: 09/831,338

(22) PCT Filed: Oct. 26, 1999

(86) PCT No.: PCT/EP99/08084

§ 371 (c)(1),
(2), (4) Date: Oct. 22, 2001

(87) PCT Pub. No.: WO00/27513

PCT Pub. Date: May 18, 2000

(30) Foreign Application Priority Data

Nov. 9, 1998 (DE) .......................................... 198 51 498

(51) Int. Cl.[7] .......................... C08F 8/36; C08G 73/18; C08G 8/02; C08G 65/48
(52) U.S. Cl. .............................. 521/27; 521/33; 521/37; 528/125; 528/220; 429/12; 429/27; 429/46
(58) Field of Search .............................. 521/27, 37, 33; 528/125; 429/12, 27, 46

(56) References Cited

U.S. PATENT DOCUMENTS 5,362,836 A * 11/1994 Helmer-Metzmann ...... 528/125
5,834,566 A   11/1998 Helmer-Metzmann et al. ... 525/535

FOREIGN PATENT DOCUMENTS

| EP | 0688824 | 12/1995 |
| EP | 0816415 | 1/1998 |
| JP | 3232536 | 10/1991 |
| WO | 9629360 | 9/1996 |
| WO | 9807164 | 2/1998 |

* cited by examiner

Primary Examiner—Fred Zitomer

(57) ABSTRACT

Polymer composition, membrane comprising the same, process for production thereof and use thereof The composition described comprises 30 to 99.5% by weight of a sulfonated aromatic polyether ketone which has an ion-exchange capacity of from 1.3 to 4.0 meq ($-SO_3H$)/g of polymer, and from 0.5 to 70% by weight of a polybenzimidazole.

This composition can, as can a sulfonated polyether ketone of PEK type, be processed to give membranes, preferably used in fuel cells.

25 Claims, No Drawings

POLYMER COMPOSITION, MEMBRANE CONTAINING SAID COMPOSITION, METHOD FOR THE PRODUCTION AND USES THEREOF

Polymer composition, membrane comprising the same, process for production thereof and use thereof.

The present invention relates to a polymer composition which is suitable in particular for producing membranes, and also to the use of these membranes in fuel cells, in high-performance capacitors, in dialysis equipment and in ultra-filtration.

Fuel cells are electrochemical energy converters which feature in particular a high level of efficiency. Among the various types of fuel cells, polymer electrolyte fuel cells (PEM hereinafter) feature high power density and a low weight to power ratio.

Conventional fuel cells generally operate using membranes based on fluorine-containing polymers, for example using the material Nafion®.

For the commercialization of fuel cell technology, in particular for relatively large-scale applications, it is necessary to reduce the production costs of the materials used without thereby having to accept sacrifice of performance compared with the materials conventionally used.

Proton-conducting membranes based on sulfonated polyether ketones are known, for example from a report article by A. Steck in Proc. 1$^{st}$ Inter. Symp. on New Materials for Fuel Cell Systems, Montreal 1995, pp. 74 or from an article by C. A. Linkous et al. in Int. J. Hydrogen Energy, Vol. 23, No. 7, pp. 525–9 (1998). WO-A-96/29359 and WO-A-96/29360 describe polymer electrolytes made from sulfonated aromatic polyether ketones, and the production of membranes from these materials.

EP-A-0152161 describes polyether ketones (PEK hereinafter) composed predominantly of the repeat unit —O—Ar—CO—Ar—Ar—, and molded structures produced therefrom.

Sulfonated, strictly alternating polyether ketones with the repeat unit —O—Ar—CO—Ar— are described in J. Polym. Sci.: Vol. 23, 2205-2222, 1985. The structure of the polyether ketones here is a result of electrophilic attack, and not nucleophilic attack as described in EP-A-0152161. The polymers were sulfonated by sulfur trioxide using triethyl phosphate in dichloroethane. Another sulfonation method used in this literature reference is chlorosulfonation using chlorosulfonic acid. However, in this method, depending on the degree of sulfonation, molecular-weight degradation is also observed. The amidation of the acid chloride follows on. A possible application sector given for polymers of this type is use as ion exchanger or as salt remover. Use in fuel cells is not described. Property profiles which suggest use in fuel cells are also absent.

EP-A-0688824 mentions membranes also for use in electrochemical cells and made from homogeneous polymer alloys based on sulfonated aromatic polyether ketones and polyether sulfones and a third, hydrophilic polymer.

WO-A-98/07164 has disclosed mixtures made from high-molecular-weight acids (sulfonated polyether ketones, for example) and high-molecular-weight bases (polybenzimidazoles, for example). However, there is no indication here of the combinations of properties required to permit operation in fuel cells. The invention described in this document is also directed toward a water-free conductivity mechanism brought about by acid/base interaction, and therefore permitting use of these materials at temperatures above 100° C. and at atmospheric pressure.

The application of polybenzimidazoles in the fuel cell has previously been described by Savinell et al. in J. Electrochemical Soc., 141, 1994, pp. L46–L48. Mixtures of different polymers with polybenzimidazoles are also known, e.g. from U.S. Pat. No. 5,290,884.

The suitability of nonfluorinated aromatic polymers, a class which includes aromatic polyether ketones, for use in fuel cells is questioned in the literature (A. Steck, Proc. 1$^{st}$ Inter. Symp. on New Materials for Fuel Cell Systems, Montreal 1995, pp 74).

Modifying the properties of polymeric materials by admixing other components is a well known process. However, the property profile of polymer mixtures is difficult to predict. It is doubtful that there is any theory which reflects the complex nature of polymer-polymer interactions (Macromolecules, Vol. 16, 1983, pp. 753–7).

The invention provides compositions from which high-performance membranes can be produced using cost-effective materials. The novel compositions moreover provide a material whose performance exceeds that of the standard fluorinated materials conventionally used. The novel compositions also provide a material from which membranes with good mechanical properties, and also excellent proton conductivity, can be produced.

This combination of properties was not to be expected and does not arise with other polymer mixtures. For example, with compositions made from sulfonated polyether ketone and polyether sulfone it is found that addition of even small amounts of polyether sulfone leads to a marked fall-off of proton conductivity of the membranes made from this material.

The present invention provides compositions comprising from 30 to 99.5% by weight of a sulfonated aromatic polyether ketone which has an ion-exchange capacity of from 1.3 to 4.0 meq (—SO$_3$H)/g of polymer and from 0.5 to 70% by weight of a polybenzimidazole.

The ion-exchange capacity (hereinafter also "IEC") is determined by elemental analysis of the washed and dried polymer via determination of the ratio of carbon to sulfur (C/S quotient).

For the purposes of this invention, aromatic polyether ketones are any polymer which has structural units —Ar—O— and —Ar—CO—, where Ar is an aromatic radical. These structural units may have been linked to one another in a variety of ways, particularly in the para position. Following widely used terminology the first unit is termed "E" (ether) and the second unit "K" (ketone). Depending on the sequence of the ether units and ketone units, a distinction can be made between, for example, PEK, PEEK, PEKK and PEEKK types. All of these types of polymer are included in the term polyether ketones for the purposes of this invention. The sulfonated aromatic polyether ketones used according to the invention may be any desired polymers, for example PEEK, PEKK, PEEKK or in particular PEK, as long as they have the ion-exchange capacity defined above.

Particular preference is given to compositions in which the sulfonated polyether ketone has the repeat unit of formula I

—[Ar$^1$—O—Ar$^2$—CO]—  (I), where Ar$^1$ and Ar$^2$, independently of one another, are bivalent aromatic radicals, unsubstituted or substituted by one or more monovalent organic groups inert under usage conditions, and where at least a portion of the radicals Ar$^1$ and Ar$^2$ have substitution by radicals of the formula —(SO$_3$)$_w$M, where M is a metal cation of valency w, an ammonium cation or in particular hydrogen, and w is an integer, in particular 1 or 2. M is preferably a cation of an alkali metal or of an alkaline earth metal.

If any radicals are bivalent aromatic radicals, these are mono- or polynuclear aromatic hydrocarbon radicals or heterocyclic-aromatic radicals which may be mononuclear or polynuclear. In the case of heterocyclic-aromatic radicals, these have in particular one or two oxygen, nitrogen or sulfur atoms in the aromatic radical.

Polynuclear aromatic radicals may have been fused with one another or bonded via C—C bonds or via bridging groups, such as —O—, —S—, —CO—, —SO$_2$— or —C$_n$H$_{2n}$—, where n is an integer from 1 to 10.

In the case of the bivalent aromatic radicals, the location of the valence bonds may be in the para position or in a comparable coaxial or parallel position or in the meta position or in a comparable angled position relative to one another.

The valence bonds which are in a coaxial or parallel position relative to one another point in opposite directions. An example of coaxial bonds which point in opposite directions is given by the bonds in 4,4'-biphenylene. An example of parallel bonds which point in opposite directions is given by the bonds in 1,5- or 2,6-naphthalene, while the 1,8-naphthalene bonds are parallel and point in the same direction.

Examples of preferred bivalent aromatic radicals Ar$^1$ and Ar$^2$, the location of whose valence bonds is in the para position or in a comparable coaxial or parallel position relative to one another, are given by the mononuclear aromatic radicals with free valences in the para position relative to one another, in particular 1,4-phenylene, or fused binuclear aromatic radicals with parallel bonds which point in opposite directions, in particular 1,4-, 1,5- and 2,6-naphthylene, or binuclear aromatic radicals linked via a C—C bond and having coaxial bonds which point in opposite directions, in particular 4,4'-biphenylene.

The valence bonds which are in the meta position or a comparable angled position relative to one another are arranged at an angle.

Examples of preferred bivalent aromatic radicals Ar$^1$ and Ar$^2$, the location of whose valence bonds is in the metaposition or in a comparable angled position relative to one another, are given by mononuclear aromatic radicals with free valences in the metaposition relative to one another, in particular 1,3-phenylene, or fused binuclear aromatic radicals with bonds which point at an angle relative to one another, in particular 1,6- and 2,7-naphthylene, or binuclear aromatic radicals linked via a C—C bond and having bonds which point at an angle relative to one another, in particular 3,4'-biphenylene.

Preferred radicals Ar$^1$ and Ar$^2$ are 1,3-phenylene or in particular 1,4-phenylene.

The aromatic radicals of the polymers used according to the invention may have substitution by inert groups. For the purposes of the present invention, these are substituents which do not adversely affect the application under consideration.

Examples of substituents of this type are alkyl, alkoxy, aryl, amino, alcohol, ether, sulfonyl, phosphonyl, acyl, nitro, carboxylic acid, carboxylic ester or carboxamide groups, or halogen.

For the purposes of the present invention, alkyl groups are branched or preferably straight-chain alkyl radicals, for example alkyl having from one to six carbon atoms, in particular methyl.

For the purposes of the present invention, alkoxy groups are branched or preferably straight-chain alkoxy radicals, for example alkoxy radicals having from one to six carbon atoms, in particular methoxy.

For the purposes of the present invention, amino groups are radicals of the formula —NH$_2$, —NHR$^1$ or —NR$^1$R$^2$, where R$^1$ and R$^2$, independently of one another, are alkyl radicals or aryl radicals, preferably methyl. For the purposes of the present invention, alcohol groups are radicals of the formula —OH.

For the purposes of the present invention, ether groups are radicals of the formula R$^1$—O—, where R$^1$ is as defined above.

For the purposes of the present invention, sulfonyl groups are radicals of the formula —SO$_2$R$^1$, where R$^1$ is as defined above.

For the purposes of the present invention, phosphonyl groups are radicals of the formula —P(OR$^3$)$_3$, where the radicals R$^3$, independently of one another, are hydrogen, alkyl or aryl.

For the purposes of the present invention, acyl groups are radicals of the formula —CO—R$^3$, where R$^3$ is as defined above.

For the purposes of the present invention, carboxylic acid groups are radicals of the formula —COOH.

For the purposes of the present invention, carboxylic ester groups are radicals of the formula —COOR$^1$, where R$^1$ is as defined above.

For the purposes of the present invention, carboxamide groups are radicals of the formula —CONH$_2$, —CONHR$^1$ or —CONR$^1$R$^2$ where R$^1$ and R$^2$ are as defined above.

If any radicals are halogen, these are fluorine or bromine, for example, or in particular chlorine.

Preference is given to compositions in which Ar$^1$ and Ar$^2$ are naphthylene or in particular phenylene.

Preference is given to compositions in which Ar$^1$ and Ar$^2$ have substitution by from one to four amino, alcohol, ether, alkyl, aryl, sulfonyl, phosphonyl, acyl, nitro, carboxylic acid, carboxylic ester and/or carboxamide groups, and/or in which the nitrogen atoms of the polybenzimidazole have substitution by these groups.

Particular preference is given to compositions in which the sulfonated polyether ketone has an ion-exchange capacity of from 1.6 to 2.9 meq (—SO$_3$H)/g of polymer.

For the purposes of the present invention, polybenzimidazoles are any polymer which has repeat structural units of the formula II

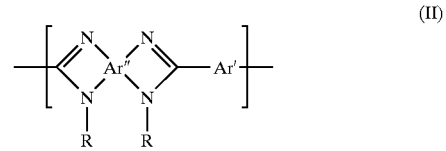

(II)

where Ar" is a tetravalent aromatic radical, Ar' is a bivalent aromatic radical and R is hydrogen or an inert monovalent organic radical.

The bivalent aromatic radicals Ar' may, as for Ar$^1$ and Ar$^2$, be mono- or polynuclear aromatic hydrocarbon radicals or heterocyclic-aromatic radicals, which may be mono- or polynuclear. The location of the valence bonds in Ar' may be in the para position or in a comparable coaxial or parallel position or in the meta position or in a comparable angled position with respect to one another. Examples of radicals Ar' have already been given above when describing the radicals Ar.

Preferred radicals Ar' are 1,3-phenylene and in particular 1,4-phenylene.

The tetravalent aromatic radicals Ar" may likewise be mono- or polynuclear aromatic hydrocarbon radicals or heterocyclic-aromatic radicals, which may be mono- or polynuclear. The valence bonds in Ar" are in each case in a pair arrangement, to allow the two imidazole rings to form.

Preferably, the location of the two valence bonds is in each case in the ortho position with respect to one another, and in turn the location of these pairs is in opposite positions on the aromatic ring or on the ring system.

Examples of preferred radicals Ar" are 1,2,4,5-phenylene and 3,4,3',4'-biphenylene.

Other polybenzimidazoles and preferred radicals Ar" and Ar' are described in U.S. Pat. No. 5,290,884, the Description of which is incorporated into the present Description.

The aromatic radicals Ar' and/or Ar" of the polybenzimidazoles used according to the invention may have substitution by inert groups. For the purposes of the present invention, these are substituents which do not adversely affect the application under consideration. Examples of these have been listed above for the sulfonated polyether ketones.

Particular preference is given to a polybenzimidazole of the formula II, in which Ar is 1,2,4,5-phenylene or 3,4,3',4'-biphenylene, Ar' is 1,3- or 1,4-phenylene and R is hydrogen.

Particular preference is given to compositions in which the proportion of the polybenzimidazole is selected depending on the degree of sulfonation of the sulfonated polyether ketone. It has been found that there is an ideal mixing ratio of sulfonated polyether ketone to polybenzimidazole, depending on the ion-exchange capacity of the polyether ketone used. Membranes produced from polymer mixtures of this type have an ideal combination of properties comprising modulus of elasticity at 80° C. in water, swelling behavior at 80° C. and proton conductivity.

For sulfonated PEK types of the formula I it has been found that the proportion of the polybenzimidazole should preferably be selected depending on the degree of sulfonation of the sulfonated polyether ketone according to formula III below:

$$\text{percent by weight of polybenzimidazole} = 9.4x - 12.4 \pm (9.4x - 12.4) \times 0.5 \quad \text{(III)}.$$

x here is the ion-exchange capacity of the sulfonated polyether ketone in meq (—SO$_3$H)/g of polymer.

The molecular weight of the polymers used in the novel compositions must be sufficient to allow polymer solutions to form from which moldings, preferably membranes, can be constructed.

The sulfonated polyether ketones preferably have molar masses (number-average) in the range from 45,000 to 70,000 g/mol, determined by gel permeation chromatography in NMP using salts with polystyrene calibration.

The polybenzimidazoles preferably have an intrinsic viscosity in the range from 0.8 to 1.2, measured at 25° C.

The novel compositions are particularly suitable for producing membranes with excellent performance characteristics.

The invention also provides membranes comprising the compositions defined above.

The novel membranes usually have a thickness of at least 5 μm, preferably more than 10 μm, particularly preferably from 10 to 100 μm. For applications in the fuel cell the thickness of the membranes is generally at least 30 μm, and for applications as a dielectric in capacitors the thickness of the membranes is generally at least 5 μm.

It is preferable to use polymer solutions with different viscosities, depending on the desired thickness of the membrane. For membranes of thickness of from 5 to 50 μm it is preferable to use polymer solutions with a viscosity of from 500 to 2000 mPas (measured at 80° C. on a solution of the polymers in the relevant solvent). For membranes of from 10 to 100 μm thickness it is preferable to use polymer solutions with a viscosity of from 1500 to 5000 mPas (measured at 80° C. on a solution of the polymers in the relevant solvent).

The resultant membranes were tested mainly with respect to their mechanical stability in the dry state and in the wet state, their proton conductivity and their performance in the fuel cell.

It has been found that the novel membranes feature excellent electrical properties. These include an ion conductivity of not less than 50 mS/cm (measured in contact with liquid water at room temperature with the aid of 4-pole impedance spectroscopy at a phase angle $|\Theta|<1°$).

Proton conductivity in the range from 120 to 200 mS/cm at 80° C. (measured by impedance spectroscopy using the 4-pole method in pure water) has been found, together with excellent mechanical properties. The novel membranes feature excellent mechanical properties. These include a modulus of elasticity of at least 600 MPa in the dry state at 23° C. and 50% relative humidity, a modulus of elasticity of at least 90 MPa in water at 60° C., a modulus of elasticity of at least 50 MPa in water at 80° C. and an ultimate elongation of more than 200%. The moduli of elasticity here were in each case determined as a gradient of the tangent at 1.2 MPa.

It has been found, therefore, that there is an increase in mechanical stability. For example, the modulus of elasticity determined in water (gradient of the tangent at 1.2 MPa) rises to a value of 350 N/mm$^2$ at 80° C. In contrast to this, the modulus of elasticity determined for pure materials was only from 4 to 5 N/mm$^2$. It is highly surprising that results of this type have not been found with mixtures using PES and PEEK (IEC 1.54 mmol/g of polymer).

The novel membranes also feature excellent resistance to boiling water. For example, it has been found that novel membranes based on sulfonated PEK remain mechanically stable after 72 hours of treatment in boiling water at 100° C.

The novel membrane preferably has a residual content of solvent of less than 0.5% by weight. It has been found that membranes made from sulfonated PEEK with an IEC of at least 1.5 meq (—SO$_3$H)/g of polymer (based on Victrex 450 PF) are stable for only from about 2 to 3 hours in boiling water. Surprisingly, membranes made from sulfonated polyether ketones, e.g. based on Victrex PEK and having a comparable IEC, are stable for more than 50 h in boiling water. The invention therefore also provides a polyether ketone of PEK type which has an ion-exchange capacity of from 1.3 to 4.0 meq (—SO$_3$H)/g of polymer, and also a membrane produced therefrom.

It has also been found that the polyether ketone polymer backbone structure, which is electron-deficient due to the absence of —O—Ar—O— units, appears to be particularly suitable for fuel-cell applications.

Sulfonated polyether ketones having the repeat unit —O—Ar—CO—Ar— can currently be produced on an industrial scale up to an IEC of about 4.0 meq (—SO$_3$H)/g of polymer.

It has been found that membranes made from highly sulfonated polymers of this type or membranes made from compositions comprising highly sulfonated polymers of this type and polybenzimidazoles are particularly useful for fuel cells with little or no humidification and also for so-called super-caps, i.e. capacitors with extremely high capacitance. The membrane may also be used in electrodialysis or in ultrafiltration. The invention also provides the use of the membranes for these applications.

The invention further provides a process for producing the membranes described above. The process comprises a) preparing a solution comprising from 30 to 99.5% by weight of a salt of a sulfonated polyether ketone and from 0.5 to 70% by weight of a polybenzimidazole by dissolving the two polymers in a suitable organic solvent, in particular dimethyl sulfoxide, N,N-dimethylformamide, N,N-dimethylacetamide or N-methyl-2-pyrrolidone, and b) shaping this solution by processes known per se, such as casting, doctoring, spraying or centrifugal processes, to give a membrane.

Mixtures of polybenzimidazoles and sulfonated polyether ketones tend to gel spontaneously as a result of the acid-base interaction which takes place, and it is therefore difficult or impossible to process them further to give sheet-like structures, such as membranes. This also applies at elevated temperature.

A homogeneous solution of sulfonated polyether ketones and polybenzimidazoles can be prepared by using polybenzimidazole and the salts, preferably the Li, Na, K or ammonium salts, of the sulfonic acids in dry organic solvents, preferably DMSO, DMF, DMAc or NMP. The resultant solution of the blend can be applied to a support and dried at temperatures up to 160° C.

Despite the diversion described via the salts of the sulfonic acid, the production technology described is of great interest, since it allows production of membranes having the combined properties of high proton conductivity and high modulus of elasticity at 80° C. in water, and also low swelling.

Phase-inversion membranes for use in ultrafiltration are usually produced by introducing the solution of the polymer or of the polymer mixture (e.g. sulfonated PEK/PBI in NMP or in DMAc) and precipitating in a non-solvent (e.g. water).

The membrane is usually converted into the acid form of the sulfonic acid by conditioning using a dilute acid, preferably a dilute mineral acid, such as an acid of from 0.1 to 20% strength (sulfuric acid, phosphoric acid or nitric acid). At the same time, ionic (salts) and organic (solvent residues) impurities are removed by this treatment.

Another way is to convert the ammonium form of the membrane into the acid form by thermal cleavage of the ammonium group (liberating $NH_3$).

If desired, the membrane obtained from the pretreatment described above may then be washed with water.

The membrane may be then be dried by heating, until, for example, the residual content of solvent is less than 0.5% by weight. Another preferred version of the novel process provides the production of a membrane in which the solution comprising from 30 to 99.5% by weight of the salt of the sulfonated polyether ketone and from 0.5 to 70% by weight of the polybenzimidazole is introduced into an absorbent web, and the solvent is then removed by evaporation.

The novel membranes may be further processed wet or dry.

The examples below illustrate the invention without limiting the same.

EXAMPLE 1

The values for proton conductivity of mixtures using sulfonated PEK and PBI were determined. The PEK had an IEC of 2.12 meq ($-SO_3H$)/g of polymer. Proton conductivity was measured using a 4-pole arrangement. The electrode material used was platinum. During the measurement, temperature-controlled demineralized water flowed across the membrane. The thickness and width of the membrane were determined in the wet state at room temperature after the treatment with 10% strength nitric acid at 40° C. and washing with demineralized water at room temperature.

The test equipment used was a Zahner IM 5d adapted for measurement in a 4-pole arrangement.

The table below gives the conductivity values determined for membranes made from various novel compositions.

| Temperature (° C.) | 5% PBI in PEKT2 Cond. (S/cm) | 6% PBI in PEKT2 Cond. (S/cm) | 7.5% PBI in PEKT2 Cond. (S/cm) | 10% PBI in PEKT2 Cond. (S/cm) | 20% PBI in PEKT2 Cond. (S/cm) |
|---|---|---|---|---|---|
| 23 | 0.056282855 | 0.032303263 | 0.020937892 | 0.013605442 | 0.003425338 |
| 30 | 0.06373923 | 0.037894398 | 0.025139398 | 0.016196955 | 0.004068961 |
| 40 | 0.075557805 | 0.045612115 | 0.030444042 | 0.019729946 | 0.004964972 |
| 50 | 0.090157708 | 0.053875319 | 0.035936192 | 0.023627396 | 0.005839962 |
| 60 | 0.120093433 | 0.072562358 | 0.043677182 | 0.028423626 | 0.00668619 |
| 70 | 0.165000165 | 0.104427736 | 0.065316573 | 0.03554655 | 0.007445129 |
| 80 | 0.212844755 | 0.153029799 | 0.094613645 | 0.044791579 | 0.008032903 |
| 80 | 0.21159084 | 0.162716718 | 0.101837142 | 0.047391961 | 0.007758072 |
| 70 | 0.193606813 | 0.146548329 | 0.0927432 | 0.046527588 | 0.006821236 |
| 60 | 0.178111123 | 0.131412736 | 0.082758164 | 0.037013218 | 0.006063031 |
| 50 | 0.159793228 | | 0.073186886 | 0.033942891 | 0.005317593 |
| 40 | 0.143398472 | 0.101506097 | 0.063428635 | 0.028582862 | 0.004400614 |
| 30 | 0.12434795 | | 0.053606943 | 0.023420644 | 0.00363643 |
| 25 | 0.116734811 | 0.077666133 | 0.046482549 | 0.02159594 | 0.003248673 |

EXAMPLE 2

Preparation of the Blends Taking the Example of the Membrane Used in 1.

The ground sulfonated polymer was introduced into an excess of 1-molar aqueous sodium hydroxide solution and heated to a temperature of from 40 to 80° C. The sodium salt of the polymersulfonate was isolated via a suction filter and compressed to remove excess aqueous sodium hydroxide solution. Finally, the polymer was washed until neutral and dried to constant weight.

The dried powder was used to prepare a solution of from 15 to 20% strength in NMP with the aid of a toothed-wheel stirrer. The clear solution was mixed with the corresponding amount of a 15% strength solution of PBI in DMAc (prepared as in EP-A-816,415) and stirred with a toothed-disk stirrer for at least 1 h. After filtration via a deep-bed PET filter with an average pore width of 0.7 μm at 80° C. the solution was applied to a glass plate by doctoring, and dried overnight in a circulating-air drying cabinet at temperatures of from 80 to 140° C.

After drying, the film was separated from the glass plate and the sodium salt removed by treating with 1-molar sulfuric acid at 40° C. The membranes were washed with demineralized water until neutral and dried.

EXAMPLE 3

Sulfonation of PEK 3.49 kg of 98% strength sulfuric acid were charged to a double-walled reaction vessel which could be heated. Using stirring by a toothed disk, 400 g of Victrex PEK were introduced as rapidly as possible into the solution. The temperature was 10 increased to 50° C. As soon as a clear, red solution had been obtained, 2.40 kg of oleum (20% of free $SO_3$) were added. As soon as the desired degree of sulfonation had been achieved (after about 1–2 hours in the case of an IEC of 2.12 meq (—$SO_3H$)/g of polymer) the solution was cooled to 20° C. and the polymer precipitated in distilled water.

The polymer was filtered off with suction, washed until neutral (test using $BaCl_2$ solution) and dried in a circulating-air drying cabinet at from 60 to 120° C.

EXAMPLE 4

Mechanical Data for the Membranes Produced as in Example 3

| IEC of PEK | Content of PBI [%] | Modulus of elasticity, 23° C., 50% rel. humidity [MPa] | Ultimate elongation [%] | Modulus of elasticity at 60° C., water* [MPa] | Ultimate elongation [%] |
|---|---|---|---|---|---|
| 2.12 | 0 | 695 | 121 | 7 | 200 |
| 2.12 | 5 | 1140 | 72 | 536 | 284 |
| 2.12 | 7.5 | 725 | 30 | 158 | 288 |
| 2.12 | 10 | 646 | 28 | 195 | 300 |
| 2.12 | 12.5 | 1445 | 111 | 124 | 370 |
| 2.12 | 17.5 | 636 | 26 | 110 | 231 |
| 2.12 | 20 | 1058 | 40 | 100 | 235 |

*measured in water, modulus of elasticity in water determined as gradient of the tangent at 1.2 MPa

What is claimed is:

1. A membrane comprising from 30 to 99.5% by weight of a sulfonated aromatic polyether ketone which has an ion-exchange capacity of from 1.3 to 4.0 meq (—$SO_3H$)/g of polymer, and from 0.5 to 70% by weight of a polybenzimidazole, obtainable by a process comprising the following steps:
    a) preparing a solution comprising from 30 to 99.5% by weight of a sulfonated polyether ketone and from 0.5 to 70% by weight of a polybenzimidazole by dissolving the salt of the sulfonated polyether ketone and the polybenzimidazole in an organic solvent,
    b) using the solution obtained in step a) to produce a membrane having a thickness of at least 5 μm,
    c) washing the membrane obtained in step b) with water or with a dilute acid of from 0.1 to 20% strength.

2. The membrane as claimed in claim 1, which has a thickness of at least 30 μm.

3. The membrane as claimed in claim 1, which has an ion-conductivity, measured in contact with liquid water at room temperature with the aid of 4-pole impedance spectroscopy at a phase angle |Θ|<1°, of not less than 50 mS/cm.

4. The membrane as claimed in claim 1, which has a modulus of elasticity (determined as gradient of the tangent at 1.2 MPa) in the dry state of at least 600 MPa at 23° C. and 50% relative humidity.

5. The membrane as claimed in claim 1, which has a modulus of elasticity (determined as gradient of the tangent at 1.2 MPa) in water at 60° C. of at least 90 MPa, and an ultimate elongation of more than 200%.

6. The membrane as claimed in claim 1, which has a residual solvent content of less than 0.5% by weight.

7. The membrane as claimed in claim 1, wherein the sulfonated polyether ketone contains repeating units of the formula I

where $Ar^1$ and $Ar^2$, independently of one another, are bivalent, aromatic or heteroaromatic radicals, unsubstituted or substituted with one or more monovalent organic groups inert under usage conditions, and wherein at least a portion of the radicals $Ar^1$ and $Ar^2$ have substitution by radicals of the formula —$(SO_3)_wM$, where M is a metal cation of valency w, or an ammonium cation, and w is the integer 1 or 2.

8. The membrane as claimed in claim 7, wherein $Ar^1$ and $Ar^2$ are naphthylene or phenylene.

9. The membrane as claimed in claim 7, wherein $Ar^1$ and $Ar^2$ are substituted by one to four amino, alcohol, ether, alkyl, aryl, sulfonyl, phosphonyl, carbonyl, nitro or carboxylic acid groups, or the nitrogen atoms of the polybenzimidazole have substitution by these groups.

10. The membrane as claimed in claim 1, wherein the polybenzimidazole has repeat structural units of the formula II

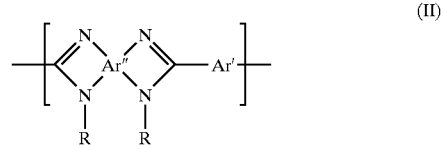

where Ar" is a tetravalent aromatic radical, Ar' is a bivalent aromatic radical and R is hydrogen or an inert monovalent organic radical.

11. The membrane as claimed in claim 10, wherein Ar" is 1,2,4,5-phenylene or 3,4,3',4'-biphenylene, Ar' is 1,3-phenylene or 1,4-phenylene and R is hydrogen.

12. The membrane as claimed in claim 9, wherein the sulfonated aromatic polyether ketone used is a polymer of PEK type which has an ion-exchange capacity of from 1.3 to 4.0 meq (—$SO_3H$)/g of polymer.

13. The membrane as claimed in claim 1, wherein the sulfonated polyether ketone is in the form of its lithium, sodium, potassium or ammonium salt.

14. The membrane as claimed in claim 1, wherein the proportion of the polybenzimidazole is selected depending on the degree of sulfonation of the sulfonated polyether ketone according to formula III below:

percent by weight of polybenzimidazole =9.4x−12.4±(9.4x−12.4)x 0.5 (III), where x is the ion-exchange capacity of the sulfonate polyether ketone in meq (—$SO_3H$)/g of polymer.

15. The membrane as claimed in claim 1, wherein the solution obtained in step a) has a viscosity of from 500 to 5,000 mPas (measured at 80° C. in a solution of the polymer in NMP (N-methylpyrrolidone) using a Couette rotary viscometer).

16. The membrane as claimed in claim 1, wherein said dilute acid is nitric acid, sulfuric acid or phosphoric acid.

17. A fuel cell which comprises the membrane as claimed in claim 1.

18. The fuel cell as claimed in claim 17, wherein the fuel cell is a direct methanol fuel cell.

19. The fuel cell as claimed in claim 17, wherein the membrane has a thickness of at least 30 µm.

20. A process for preparing a membrane which comprises the following steps:
   a) preparing a solution comprising from 30 to 99.5% by weight of a sulfonated polyether ketone and from 0.5 to 70% by weight of a polybenzimidazole by dissolving the salt of the sulfonated polyether ketone and the polybenzimidazole in an organic solvent,
   b) using the solution obtained in step a) to produce a membrane having a thickness of at least 5 µm,
   c) washing the membrane obtained in step b) with water or with a dilute acid of from 0.1 to 20% strength.

21. The process as claimed in claim 20, wherein the membrane is dried by heating until the residue content of a solvent is less than 0.5% by weight.

22. The process as claimed in claim 20, wherein the polybenzimidazole have an intrinsic viscoity in the range from 0.8 to 1.2 measured at 25° C.

23. A capacitor which comprises a dielectric comprising the membrane as claimed in claim 1.

24. In a method for electrodialysis wherein the improvement comprises using the membrane as claimed in claim 1.

25. A method of ultra filtration which comprises filtering with the membrane as claimed in claim 1.

* * * * *